United States Patent Office 2,806,270
Patented Sept. 17, 1957

2,806,270

METHOD OF MAKING MOULDS FOR PRECISION CASTING

Basil James Shaul, Chaddesden, Derby, England, assignor to Rolls-Royce Limited, Derby, England No Drawing. Application July 12, 1954,
Serial No. 442,933

Claims priority, application Great Britain July 17, 1953

9 Claims. (Cl. 22—196)

In what has now become recognised as the conventional method of making moulds for investment casting using an expendable pattern such as wax or plastic, the mould is produced by a two stage process. The first involves a relatively thin coating of the pattern assembly by spraying, painting or dipping and the second the final investment of the coated pattern in a suitable container by a slurry or refractory suspended in a liquid binding medium, the final consolidation of the mould being obtained by vibration.

When the liquid binding medium has hardened by chemical action, the expendable pattern is melted out by heating at 100–150° C. for several hours. Following this, the mould is gradually raised to a temperature in the range 850°–1100° C. to remove completely the last trace of wax and volatile constituent of the binder medium. This requires several hours heating.

As an alternative to this process it has been proposed to form a multi-layer shell mould around the expendable pattern by a process which includes dipping alternately in an acid and alkaline solution of sodium silicate and including a finely ground refractory material suspended in the solution, the normality of the alkaline solution being greater than that of the acid solution, each dipping being followed by the application of a stucco material to the wet mould.

Preferably before the application of the layers of the shell proper the pattern is given an initial refractory coating by dipping in or spraying with a solution of the type used in the conventional method.

A suitable acid solution has been proposed as follows:

| | | |
|---|---|---|
| Sodium silicate | ml | 790 |
| Water | ml | 1450 |
| Concentrated nitric acid | ml | 260 |
| Flint powder | lbs | 10 |

A suitable alkali solution has been proposed as follows:

| | | |
|---|---|---|
| Sodium silicate | ml | 790 |
| Water | ml | 1710 |
| Flint powder | lbs | 10 |

This mixture is 0.88 normal alkali.

Each layer or coat of the shell is produced by one dip in each solution, each dip being followed by the "stuccoing" operation.

Any time up to about one hour may elapse between the dips in the acid and alkali solutions as long as the former has not dried because it must be wet in order that the gelling reaction will follow. The dipping may, however, take place without any interval of time at all and I prefer that that interval be not more than two or three minutes.

The second and succeeding dips in acid solution can be made at any convenient interval after the preceding alkali dip, from ¼ to 3 hours being generally most suitable.

A variety of refractory materials can be used for the stuccoing operation such as silica, sillimanite, firebrick grog (crushed firebrick), zirconia, zircon and the like.

It has now been discovered that as advantageous alternatives to sodium silicate solution there can be used in either the acid or alkaline solution or in both a silicate selected from the group containing ethyl and potassium.

In using the word "solution" I include silica sols, that is, liquids in which the silica instead of being in the true solution is in the colloidal state.

The solutions may be organic or inorganic and in the term "alkaline solution" I include those solutions which give an alkaline reaction such as those with organic bases in alcohol, and in speaking of the "normality" of the alkaline solution I include the effective normality of solutions giving an alkaline reaction.

Suitable acid solutions are:

(a)

| | | |
|---|---|---|
| Potassium silicate | ml | 1200 |
| Water | ml | 965 |
| Concentrated phosphoric acid | ml | 335 |
| Flint powder | lbs | 10 |

This is a 0.5 normal acid solution prepared by mixing some of the water and acid and pouring the diluted silicate slowly into the acid solution with vigorous stirring to prevent it gelling.

(b)

| | | |
|---|---|---|
| Ethyl silicate | ml | 1600 |
| Methylated spirits | ml | 840 |
| Water | ml | 100 |
| Normal hydrochloric acid | ml | 6 |
| Flint powder | lbs | 12 |

This mixture which is in the nature of a colloid or sol is made by mixing the methylated spirits, water and hydrochloric acid and adding the ethyl silicate with vigorous stirring.

Suitable alkaline solutions and solutions giving an alkaline reaction are:

(a)

| | | |
|---|---|---|
| Potassium silicate | ml | 2400 |
| Water | ml | 100 |
| Flint powder | lbs | 10 |

(The normality of this solution is 2.3 N alkali.)

(b)

| | | |
|---|---|---|
| Ethyl silicate | ml | 1225 |
| Piperidine (an organic base) | ml | 25 |
| Methylated spirits | ml | 1250 |
| Flint powder | lbs | 12 |

(Organic base, alkaline reaction.)

(c)

| | | |
|---|---|---|
| Ethyl silicate | ml | 1250 |
| Monoethanolamine (organic base) | ml | 65 |
| Methylated spirits | ml | 1185 |
| Flint powder | lbs | 12 |

(Organic base alkaline reaction.)

In all these dipping solutions including those forming the primary coat, the flint may be replaced by other finely ground refractories such as zircon, sillimanite, zirconia, alumina and the like. Alkaline solutions of ethyl silicate are unstable so these are made using organic nitrogenous bases such as piperidine, the ethanolamines, quinaline and the like which give an alkaline reaction.

The ratio of the actual normality or the effective normality of an alkaline solution to that of the acid solution is preferably greater than has previously been prepared, namely from 5:1 to 7:1. This ensures rapid gelling when the alkaline solution is imposed upon the acid solution.

The silica content of the alkaline dipcoat is preferably made higher than that of the acid dipcoat to ensure a strong mould. When using potassium silicate a suitable silica concentration for the alkaline solution is 15–25% whereas for the acid solution a silica concentration of 5–7.5% is to be preferred. In this type of solution there is but little difference in percentage quotations by weight or by volume. An acid solution containing more than 10% of silica is very difficult to prepare and the resulting solutions are unstable. Therefore, the bulk of the silica required for forming a strong bond in the mould may best be supplied by the alkaline solution.

Each layer or coat of the shell is produced by one dip in each solution, each dip whether in acid or alkali being followed by the "stuccoing" operation.

Any time up to about one hour may elapse between the dips in the acid and alkali solutions as long as the former has not dried because it must be wet in order that the gelling reaction will follow. The dipping may, however, take place without any interval of time at all and I prefer that that interval be not more than two or three minutes.

The second and succeeding dips in acid solution can be made at any convenient interval after the preceding alkali dip, from ¼ to 3 hours being generally most suitable.

A variety of refractory materials can be used for the stuccoing operation such as silica, sillimanite, firebrick grog (crushed firebrick), zirconia, zircon and the like. Firebrick grog is preferred.

It has been found that refractories within the following range of composition give good results and in particular one preferred composition is as follows:

| Sieve Size | Percent retained by weight | Preferred composition |
|---|---|---|
| +16 | 0–5 | 2.0 |
| −16+30 | 10–40 | 20.0 |
| −30+52 | 20–60 | 25.0 |
| −52+72 | 5–20 | 10.0 |
| −72+100 | 5–20 | 10.0 |
| −100+150 | 0–10 | 5.0 |
| −150+200 | 0–10 | 2.0 |
| −200 | 0–30 | 26.0 |

An initial coat is formed on the pattern by spraying with or dipping in a refractory solution of known composition.

Suitable solutions to form the initial coat are as follows:

(a) *Applied by spraying*

(1)

| | | |
|---|---|---|
| Soap solution | ml | 320 |
| Sodium silicate | ml | 160 |
| Hydrochloric acid 10% | ml | 36 |
| Flint powder | gm | 1000 |

(2)

| | | |
|---|---|---|
| Ethyl silicate containing 2% piperidine | ml | 160 |
| Methylated spirits | ml | 320 |
| Flint powder | gm | 1000 |

(3)

| | | |
|---|---|---|
| Ethyl silicate | ml | 70 |
| Methylated spirits | ml | 425 |
| Water | ml | 5 |
| Flint powder | gm | 1000 |

(b) *Applied by dipping*

(1)

| | | |
|---|---|---|
| Water | ml | 2160 |
| Sodium silicate | ml | 1800 |
| Glycerine | ml | 600 |
| Hydrochloric acid 10% | ml | 650 |
| Ammonium alginate 10% sol | ml | 150 |
| Octyl alcohol | ml | 5 |
| Sulphocrex (wetting agent) | ml | 75 |
| Flint powder | lbs | 23 |

(2)

| | | |
|---|---|---|
| Water | ml | 4530 |
| Gelatine | gm | 40 |
| Glycerine | ml | 350 |
| Sodium silicate | ml | 2000 |
| Hydrochloric acid 10% | ml | 950 |
| Octyl alcohol | ml | 90 |
| Sulphocrex | ml | 150 |
| Flint powder | lbs | 32 |

(3)

| | | |
|---|---|---|
| Ethyl silicate | ml | 1350 |
| Methylated spirits | ml | 3720 |
| Hydrochloric acid 10% | ml | 250 |
| Water | ml | 80 |
| Flint powder | lbs | 23 |

(4)

| | | |
|---|---|---|
| Ethyl silicate containing 2% piperidine | ml | 160 |
| Methylated spirits | ml | 320 |
| Flint powder | gm | 1000 |

(5)

| | | |
|---|---|---|
| Ethyl silicate | ml | 4500 |
| Saturated solution of gum Arabic in benzene | ml | 750 |
| Octyl alcohol | ml | 150 |
| Teepol X | ml | 250 |
| Flint powder | gm | 1000 |

If the primary coating is applied by dipping the coating while still wet is "stuccoed" by dusting with a somewhat coarse grained refractory.

The expendable pattern may be removed by heating at 100 to 150° C. for several hours as previously proposed. Another suitable method is to immerse the mould in the hot vapour of a halogenated paraffin.

If a high melting point alloy (more than 1000° C.) is to be cast the mould should be fired and for all moulds firing is very desirable. The firing should take place after removing the expendable pattern and the temperature should be at least 900° C. but preferably to 1100° C. to strengthen the bond. After firing moulds have been found to be sufficiently strong to be used for casting without any additional support, and may be so used while still hot to enable thin sections to be run. For alloys of low melting points (less than 1000° C.) the mould may be cooled down to any intermediate temperature between that and room temperature.

Where a stronger mould is required as in pressure casting it will be desirable to invest the mould in normal manner and a fritting agent may be incorporated in the investment. Various fritting materials may be used such as anhydrous sodium silicate, sodium nitrate, sodium silico-fluoride. A very suitable fritting agent is ammonium phosphate. These materials frit at different temperatures and one should be chosen which will frit at the temperature at which the mould is to be heated.

Alternatively the mould may be supported by investment in dry sand, metal shot or mica powder.

I claim:

1. The method of forming a multi-layer shell mould around an expendable pattern which includes preparing two solutions of a soluble silicate of which in at least one of the solutions the silicate is selected from the group consisting of ethyl and potassium, each containing a finely ground refractory material suspended therein and one being alkaline and the other having an acid material added to make the same acid but of a normality less than the normality of the alkaline solution, and then dipping the pattern repeatedly alternately in the acid and then in the alkaline solution while the acid solution is still wet thereon and applying a stucco material to the wet shell after each dipping.

2. The method claimed in claim 1 in which an initial refractory coat is formed on the pattern.

3. The method claimed in claim 2 in which after each dipping the wet shell is exposed to a shower of finely ground refractory material.

4. The method claimed in claim 3 in which the ratio of the normality of the alkaline solution to the acid solution is of the order of from 5:1 to 7:1.

5. The method claimed in claim 1 in which the shell mould is invested prior to casting in an investment material including a fritting agent.

6. The method claimed in claim 1 in which after removal of the pattern the mould is fired.

7. The method of forming a multi-layer shell mould around an expendable pattern which includes preparing two solutions of soluble silicate each containing finely ground refractory material suspended therein one being alkaline and the other being formed of a silicate selected from the group consisting of ethyl and potassium and having concentrated phosphoric acid added thereto to make this other solution acid but of a normality less than the normality of the alkaline solution and then dipping the pattern alternately in the acid and the alkaline solution, each alkaline dip following an acid dip before the latter is dry on the pattern and applying a stucco material to the wet shell after each dipping.

8. The method of forming a multi-layer shell mould around an expendable pattern which includes preparing two solutions of a soluble silicate of which in at least one of the solutions the silicate is selected from the group consisting of ethyl and potassium, each containing a finely ground refractory material suspended therein and one being alkaline and the other having an acid material added to make the same acid but of a normality less than the normality of the alkaline solution, the silica concentration being higher in the alkaline than in the acid solution and then dipping the pattern alternately in the acid and in the alkaline solution, each alkaline dip following an acid dip before the coating formed by the latter is dry.

9. The method claimed in claim 8 in which the silica concentration for the alkaline solution is from 15 to 25 percent and for the acid solution 5 to 7.5 percent, both by weight.

References Cited in the file of this patent

UNITED STATES PATENTS

| | | |
|---|---|---|
| 764,849 | Hubbard | July 12, 1904 |
| 2,027,932 | Ray | Jan. 14, 1936 |
| 2,380,945 | Collins | Aug. 7, 1945 |
| 2,441,695 | Feagin et al. | May 18, 1948 |
| 2,491,096 | Feagin | Dec. 13, 1949 |
| 2,521,839 | Feagin | Sept. 12, 1950 |

FOREIGN PATENTS

| | | |
|---|---|---|
| 580,058 | Great Britain | Aug. 26, 1946 |
| 594,671 | Great Britain | Nov. 17, 1947 |
| 669,130 | Great Britain | May 26, 1952 |